United States Patent [19]

Ohtsuka

[11] Patent Number: 5,033,524
[45] Date of Patent: Jul. 23, 1991

[54] TIRE WITH THREE ELASTOMERIC PROTECTIVE LAYERS LOCATED IN THE BEAD PORTION OF THE TIRE

[75] Inventor: Junichi Ohtsuka, Higashikyrume, Japan

[73] Assignee: Bridgestone Corporation, Tokyo, Japan

[21] Appl. No.: 395,125

[22] Filed: Aug. 17, 1989

[30] Foreign Application Priority Data

Aug. 18, 1988 [JP] Japan .................. 63-203917

[51] Int. Cl.$^5$ ........................... B60C 15/06
[52] U.S. Cl. .................. 152/542; 152/539; 152/543; 152/546
[58] Field of Search ............... 152/547, 539, 543, 542

[56] References Cited

U.S. PATENT DOCUMENTS 4,227,563 10/1980 Grosch et al. .............. 152/547 X
4,387,759 6/1983 Obata et al. ................ 152/543 X
4,508,153 4/1985 Tanaka et al. ............... 152/543

Primary Examiner—Michael W. Ball
Assistant Examiner—Nancy T. Krawczyk
Attorney, Agent, or Firm—Sughrue, Mion, Zinn, Macpeak & Seas

[57] ABSTRACT

A tire for a large vehicle includes bead portions having bead cores around which a carcass ply layer is turned up from an inside to an outside of the tire. The tire includes a first elastomer protective layer A, a second elastomer protective layer B and a third elastomer protective layer C. These protective layers A, B and C have dynamic storage moduli E' A: $7-20\times10^7$ (dyn/cm$^2$), B: $10-25\times10^7$ (dyn/cm$^2$) and C: $2-10\times10^7$ (dyn/cm$^2$) and relations of the dynamic storage moduli in B>A>C, B−A>$2\times10^7$ and A−C>$2\times10^7$, and have loss tangents $\delta$ A: 0.15–0.22, B: 0.18–0.25 and C: 0.05–0.16 and a relation of loss tangents in B>A>C.

2 Claims, 3 Drawing Sheets

TIRE WITH THREE ELASTOMERIC PROTECTIVE LAYERS LOCATED IN THE BEAD PORTION OF THE TIRE

BACKGROUND OF THE INVENTION

This invention relates to a tire having beads whose durability is improved for a large vehicle, and more particularly to a radial tire having highly durable beads.

Tires for large vehicles, are almost always used under heavy loads so that bead portions adjacent rims are likely to cause troubles or failures to shorten their service life. However, no publications disclose effective prevention of such troubles of tires.

There are following two kinds of troubles occurring at bead portions of large vehicle tires: (A) troubles resulting from cracks of rubber at an area between a location two thirds of a height of a rim flange and a position radially outward of the location where the rubber starts to contact the rim, and (B) separations occurring in a rubber portion adjacent the area mentioned in (A) and positioned between the area and a carcass ply layer.

In order to mitigate these troubles, it has been attempted to improve configurations of cord layers as skeletons of a tire, to employ thicker cord layers, and to modify rubber properties in the proximity of beads. However, these attempts are not necessarily effective for the improvement of bead durability.

In more detail, as the tires for large vehicles are usually used under heavy loaded conditions, they encounter the following difficulties. (1) The rubber directly contacting a rim is needed to be high elastic or resilient in order to improve the fitting ability with the rim. However, if the elasticity of the rubber is too high, cracks would occur in the rubber contacting the rim flange. (2) It is required for the rubber in beads to prevent reduction of input when using a low elasticity rubber and prevent high temperature at bead portions when using a low heating rubber. However, strains would concentrate due to the low elasticity so that it becomes disadvantageous for separations.

SUMMARY OF THE INVENTION

It is an object of the invention to provide a tire for a large vehicle, which solves the above problems of the prior art by balancing elasticity of rubbers and balancing heating property of rubbers to improve the durability of beads of the tire.

In order to achieve the object, a tire for a large vehicle including bead portions having bead core around which a carcass ply layer is turned up from an inside to an outside of the tire according to the invention comprises a first elastomer protective layer A extending radially outwardly from a location in the proximity of at least two thirds of a height of each flange of a rim to a location where the tire starts to separate from the rim, a second elastomer protective layer B extending from the first elastomer protective layer A through a bead base in contact with the rim, and a third elastomer protective layer C arranged between the first elastomer protective layer A and the carcass ply layer, and the first, second and third elastomer protective layers A, B and C having dynamic storage moduli E', $\underline{A}$: $7-20\times 10^7$ (dyn/cm$^2$), B: $10-25\times 10^7$ (dyn/cm$^2$) and C: $2-10\times 10^7$ (dyn/cm$^2$) and relations with respect to the dynamic storage moduli E' in $B>A>C$, $B-A>2\times 10^7$ and e,uns/A/ $-C>2\times 10^7$, having loss tangents δ, $\underline{A}$: 0.15—0.22, B: 0.18—0.25 and C: 0.05—0.16 and a relation with respect to the loss tangents δ in $B>\underline{A}>C$.

It is particularly preferable to extend the first elastomer protective layer $\underline{A}$ to a location radially inwardly of a location one half of the height of each flange of the rim.

The dynamic storage moduli E' and the loss tangents δ of the respective elastomer protective layers are measured by the us of viscoelastic spectrometers manufactured by IWAMOTO SEISAKUSHO CO., LTD. under conditions of 30° C. of temperature, 52 Hz of frequency and 0.5% of initial strain.

In order that the invention may be more clearly understood, preferred embodiments will be described, by way of example, with reference to the accompanying drawings.

EXPLANATION OF THE PREFERRED EMBODIMENTS

Figure 1:
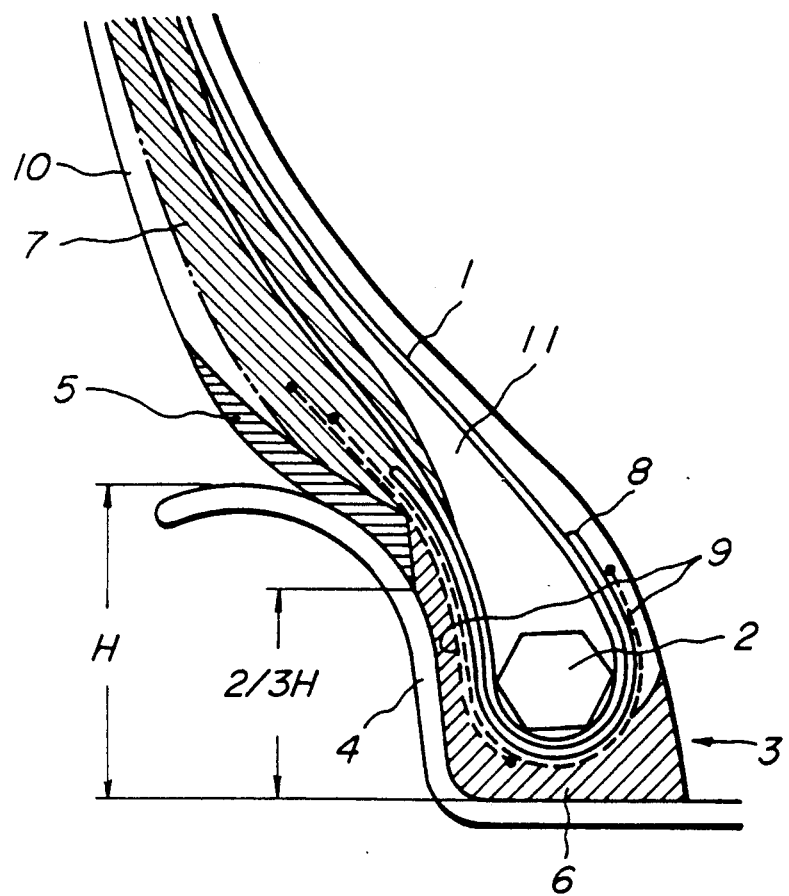
FIGS. 1-3 are sectional views illustrating three embodiments of the tire according to the invention.
Figure 2:
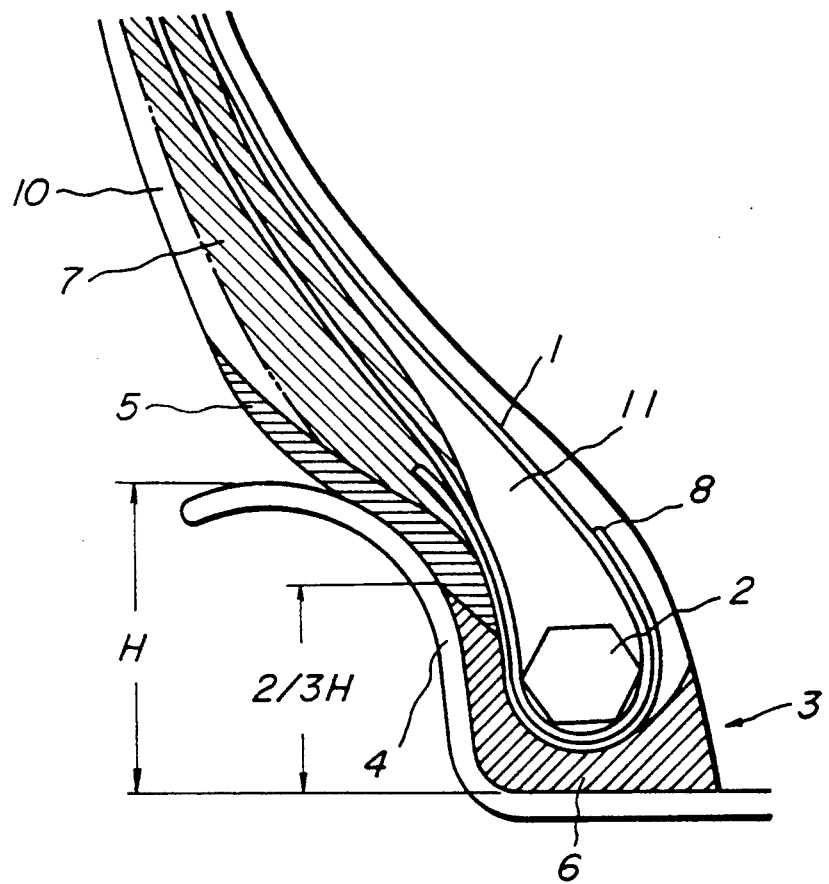
Figure 3:
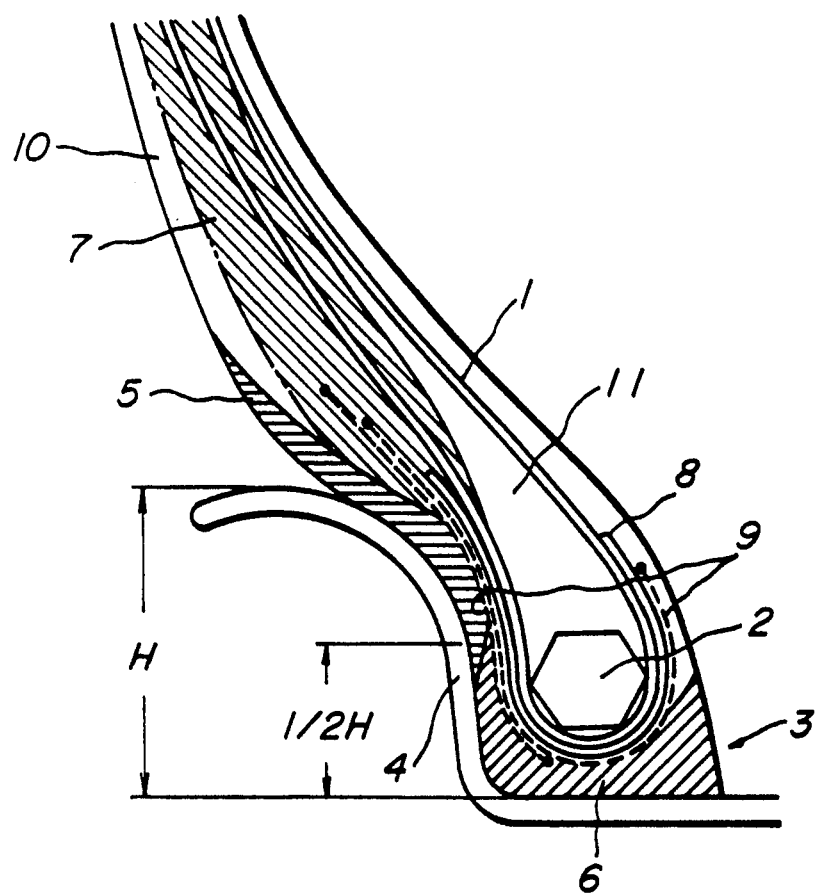

FIGS. 1-3 illustrate sections of important portions of tires according to the invention. Each of these tires includes, in one fourth of the tire, a carcass ply layer 1, and a bead portion 3 including a core 2 adjacent one flange 4 of a rim.

The tire further includes, in one fourth of the tire, elastomer protective layers $\underline{A}$, B and C designated by 5-7, a chafer 8, a nylon chafer 9 (omitted in the embodiment shown in FIG. 2), a sidewall rubber 10, and a stiffener rubber 11.

The elastomer protective layer $\underline{A}$ extends radially outwardly from a location in the proximity of at least two thirds of a height of the flange 4 of the rim to a location where the tire starts to separate from the rim. The protective layer $\underline{A}$ preferably extends to a location radially inwardly of a location one half of the height of the flange of the rim.

The elastomer protective layer B extends from the protective layer $\underline{A}$ through a bead base in contact with the rim. The elastomer protective layer C is arranged between the protective layer $\underline{A}$ and the carcass ply layer.

According to the invention, there is provided a combination of the respective elastomer protective layers $\underline{A}$, B and C to mitigate forces to be applied between the tire and the rim, thereby preventing any concentration of strains. As a result, the durability of beads is considerably improved.

In order to accomplish such an effect, it is needed for the elastomer protective layer $\underline{A}$ to have a physical characteristic such as a dynamic storage modulus E' of $7-20\times 10^7$ dyn/cm$^2$ whose upper and lower limits are defined by a rhythm property and a cracking property, respectively.

As to the elastomer protective layer B, the dynamic storage modulus E' is $10-25\times 10^7$ dyn/cm$^2$ which is higher than that of the protective layer $\underline{A}$ by more than $2\times 10^7$ dyn/cm$^2$. An upper and a lower limit of the modulus E' are needed for the rim fitting property and the rubber defective property (cracking property when removing from rim), respectively.

As to the elastomer protective layer C, the dynamic storage modulus E' is $2-10\times 10^7$ dyn/cm$^2$ which is lower than that of the protective layer $\underline{A}$ by more than $2\times 10^7$ dyn/cm$^2$. An upper and a lower limit of the modulus E' are needed for prevention of occurrence (growth) of cracks in the protective layer A and prevention of separation between the carcass ply and wire chafer respectively and the elastomer protective layer C.

Relations with respect to the dynamic storage moduli for the protective layers A, B and C are B>A>C, $B-A>2\times10^7$ and $A-C>2\times10^7$.

The relation between the protective layers A, B and C as to the dynamic storage modulus holds true in the relation between layers as to the loss tangent. The protective layers A, B and C are required to have the loss tangents δ of 0.15—0.22, 0.18—0.25, and 0.05—0.16, respectively. These values are required for restraining cracks in the protective layer A due to high temperatures by heating and for mitigating separations between the carcass ply and wire chafer respectively and the protective layer C.

A relation with respect to the loss tangents for the protective layers A, B and C is B>A>C.

EXAMPLE

Tires of size 1400 R20 (steel radial construction) were produced by way of trials shown in Table 1. Drum tests were effected under normal inner pressure with 120% load. In the drum tests, a tire was urged against a drum of a drum testing machine and the drum was rotatively driven to drive the tire.

Failures at the bead portions were checked at the elastomer protective layers A and C. Conditions of the failures were divided into five classes. The tires exhibited good results by the control of the protective layers were indicated by numerals more than 3. The tires which did not exhibit the expected effect were indicated by numerals less than 3.

As can be seen from the above explanation, the tire according to the invention is superior in durability of beads, as a result of the remarkable improvement with the aid of the protective layers.

It is further understood by those skilled in the art that the foregoing description is that of preferred embodiments of the disclosed tires and that various changes and modifications may be made in the invention without departing from the spirit and scope thereof.

TABLE I

| Constitution of tire | | | Comparative constitution (1) | Comparative constitution (2) | According to the invention (3) | According to the invention (4) | Comparative constitution (5) | Comparative constitution (6) | Comparative constitution (7) |
|---|---|---|---|---|---|---|---|---|---|
| Physical property of elastomer protective layers | A | E'* | 15 | 15 | 10 | 15 | 11 | 25 | 25 |
| | | tan δ | 0.240 | 0.220 | 0.210 | 0.220 | 0.210 | 0.280 | 0.280 |
| | B | E'* | 15 | 15 | 23 | 20 | 10 | 25 | 10 |
| | | tan δ | 0.240 | 0.220 | 0.240 | 0.230 | 0.210 | 0.280 | 0.210 |
| | C | E'* | 10 | 15 | 5 | 10 | 5 | 5 | 5 |
| | | tan δ | 0.160 | 0.220 | 0.110 | 0.120 | 0.110 | 0.110 | 0.110 |
| A cracks of rubber | | | 3 | 3 | 5 | 4 | 3 | 2 | 1 |
| C Separation | | | 3 | 1 | 5 | 5 | 4 | 3 | 3 |

*The unit of E' is $\times 10^7$ dyn/cm².

What is claimed is:

1. A tire for a large vehicle including bead portions having bead cores around which a carcass ply layer is turned up from an inside to an outside of the tire, comprising; a first elastomer protective layer A extending radially outwardly from a location in the proximity of at least two thirds of a height of each flange of a rim to a location where the tire starts to separate from the rim, a second elastomer protective layer B extending from the first elastomer protective layer A through a bead base in contact with the rim, and a third elastomer protective layer C arranged between the first elastomer protective layer A and the carcass ply layer, and these first, second and third elastomer protective layers A, B and C having dynamic storage moduli E', A:$7-20\times10^7$ (dyn/cm²), B: $10-25\times10^7$ (dyn/cm²) and C: $2-10\times10^7$ (dyn/cm²) and relations with respect to the dynamic storage moduli E' in B>A>C. $B-A>2\times10^7$ and $A-C>2\times10^7$, and having loss tangents δ, A: 0.15–0.22, B: 0.18–0.25 and C: 0.05–0.16 and a relation with respect to the loss tangents δ in B>A>C; wherein dynamic storage moduli E' are determined based on measurements at 30° C. temperature, 52 Hz frequency and 0.5% initial strain.

2. A tire for a large vehicle as set forth in claim 1, wherein the radially inner end of said first elastomer protective layer A extends to a location radially inwardly of a location one half of the height of each flange of the rim.

* * * * *